US005169722A

United States Patent [19]

Nakashima

[11] Patent Number: 5,169,722

[45] Date of Patent: Dec. 8, 1992

[54] ANTI-COPYING COMPOSITE FILM

[75] Inventor: Shin Nakashima, Nara, Japan

[73] Assignee: Kisokaseisangyou Co., Ltd., Japan

[21] Appl. No.: 620,358

[22] Filed: Nov. 29, 1990

[30] Foreign Application Priority Data

Jun. 29, 1990 [JP] Japan .................................. 2-171599

[51] Int. Cl.[5] ........................ B32B 15/08; B32B 15/10

[52] U.S. Cl. .................................... 428/457; 283/94; 283/902; 428/464; 428/916

[58] Field of Search ................. 428/416, 457, 40, 464, 428/916; 156/471; 283/902, 94

[56] References Cited

U.S. PATENT DOCUMENTS 4,569,714 2/1986 Tokuno .............................. 156/471

4,578,298 3/1986 Nagafuchi ............................ 428/40

4,981,759 1/1991 Nakatani et al. .............. 428/416 X

*Primary Examiner*—Thomas J. Herbert, Jr.

*Attorney, Agent, or Firm*—John F. A. Earley; John F. A. Earley, III

[57] ABSTRACT

An anti-copying composite film comprising a substratum of paper or synthetic resin film, a metallic foil formed on the surface of said substratum and a colored transparent synthetic resin coating layer applied to the surface of said metallic foil, said anti-copying composite film being characterized in that the color of the coating layer is selected in Munsell color system so that the value may be 9 or less than 9 regardless of the hue, while the chroma is selected so that an index calculated in a formula on the base of the difference of the value and the difference of chroma with respect to those of black may be 20 or more than 20.

1 Claim, 2 Drawing Sheets

ANTI-COPYING COMPOSITE FILM

TECHNICAL FIELD

This invention relates to an anti-copying composite film capable of being recorded on it with information which is to be protected from being reproduced by means of electrostatic copiers etc.

BACKGROUND OT THE INVENTION

There were two kinds of anti-copying composite films, as disclosed in U.S. Pat. No. 4,578,298. One was an anti-copying composite film comprising a substratum of synthetic resin film, a metallic foil formed on the surface of the substratum and an orange, brown or red colored transparent synthetic resin coating layer formed on the surface of the metallic foil. The anti-copying composite film was capable of being recorded on the surface of the coating layer with information such as letters and figures by means of hand-writing, printing, copying etc., and the information was protected from being reproduced by means of black-and-white electrostatic copiers or camera. The other was an anti-copying composite film comprising a substratum of transparent synthetic resin film, a metallic foil capable of being seen through formed on the surface of the substratum and an orange, brown or red colored synthetic resin coating layer formed on the surface of the metallic foil, and the anti-copying composite film was capable of being affixed with the back of the substratum to the surface of documents, on which information had been recorded, to protect the information from being reproduced by means of black-and-white electrostatic copiers or camera.

The foregoing metallic foil was formed by means of ordinary vacuum deposition, however, it could be formed by transferring a metallic foil, which was produced on another substratum by vacuum deposition, to the surface of the substratum, or by applying an ordinary metallic foil to the surface of the substratum.

SUMMARY OF THE INVENTION

The invention relates to the anti-copying composite film of the former type. With respect to the anti-copying composite film of the former type, there was a problem that information was very illegible, because the information had been recorded on the orange, brown or red colored synthetic resin coating layer.

Furthermore, electrostatic copiers are being changed from black-and-white type to color type, and accordingly, it became impossible for the foregoing anti-copying composite film to protect information of the documents perfectly from being reproduced.

An object of the present invention is to provide an anti-copying composite film comprising a substratum of paper or synthetic resin film, a metallic foil formed on the surface of the substratum and a colored transparent synthetic resin coating layer applied to the surface of the metallic foil, said anti-copying composite film being capable of being recorded with information on the surface of the resin coating layer, and capable of protecting the information, which has been recorded on it, from being reproduced, and characterized in that the information which has been recorded on it is very legible, and perfectly protected from being reproduced, even if any color electrostatic copier is used.

To accomplish the above-mentioned object, the invention provides an anti-copying composite film comprising a substratum of paper or synthetic resin film, a metallic foil formed on the surface of the substratum and a colored transparent synthetic resin coating layer applied to the surface of the metallic foil, said anti-copying composite film being characterized in that the color of the colored transparent synthetic resin coating layer is selected in Munsell color system so that the value of the color may be 9 or less than 9 regardless of the hue, while the chroma of the color is selected so that an index, which is to be calculated in accordance with the following formula on the base of the difference of the chroma and the difference of the value with respect to those of black, may be 20 or more than 20:

$$[(\Delta C)^2+(4\times\Delta V)^2]^{\frac{1}{2}}$$

wherein $\Delta C$ represents the difference of chroma from that of black, and $\Delta V$ represents the difference of value from that of black.

Since the color of the colored transparent synthetic resin coating layer is selected in Munsell color system so that the value may be 9 or less than 9, black-and-white information, which has been recorded on the anti-copying composite film by means of hand-writing, printing or copying, can't be reproduced, that is to say, legible reproductions of the information can't be made, when the information is reproduced by black-and-white or color electrostatic copiers.

Besides, since the color of the colored transparent synthetic resin coating layer of the anti-copying composite film is selected in Munsell color system so that an index (to be exact, a fading index in Godlove color-difference formula) of the chroma calculated on the base of the difference of the chroma from that of black and the difference of the value from that of black may be 20 or more than 20, and since the anti-copying composite film comprises a metallic foil, information which has been recorded on the synthetic resin coating layer is very legible.

EXAMPLES

Samples of the anti-copying composite film according to the invention, as listed in the following table, were made by forming an aluminum foil on a substratum of paper, and subsequently applying to the surface of the aluminum foil respective colored synthetic resin solutions, which were different from each other with respect to the hue, the chroma and the value, to form various colored coating layers. After information was recorded on each surface of the synthetic resin coating layer of respective samples with black ink, the chroma and the value of which were 1 or less than 1, tests were carried out to examine whether the information was easily read or not. Then, respective Godlove fading, indices were calculated. Subsequently, the samples were reproduced by means of a color electrostatic copier, and it was examined whether reproductions were legible or not. Result of the tests is shown in the following table.

TABLE

| | SAMPLES | | | | RESULT OF TESTS | |
|---|---|---|---|---|---|---|
| NO. | HUE | VALUE | CHROMA | INDEX | RECORD | REPRODUCTION |
| 1 | 7.5 Y | 9.5 | 2 | 34.02 | legible | legible |
| 2 | 7.5 Y | 9.5 | 1 | 34.00 | same | same |
| 3 | 5 Y | 9 | 2 | 32.02 | same | illegible |
| 4 | 5 Y | 9 | 1 | 32.00 | same | same |
| 5 | 2.5 Y | 7 | 6 | 24.52 | same | same |
| 6 | 5 GY | 7 | 2 | 24.02 | same | same |
| 7 | 5 GY | 7 | 1 | 24.00 | same | same |
| 8 | 10 BG | 6 | 6 | 20.62 | same | same |
| 9 | 10 BG | 6 | 1 | 20.00 | same | same |
| 10 | 2.5 G | 5.5 | 6 | 18.68 | illegible | same |
| 11 | 2.5 G | 5.5 | 11 | 20.59 | legible | same |
| 12 | 10 R | 5 | 18 | 23.35 | same | same |
| 13 | 10 R | 5 | 13 | 20.00 | same | same |
| 14 | 2.5 YR | 5 | 11 | 18.87 | illegible | same |
| 15 | 10 RP | 4 | 17 | 20.00 | legible | same |
| 16 | 10 RP | 4 | 14 | 17.69 | illegible | same |
| 17 | 10 P | 3 | 10 | 12.04 | same | same |
| 18 | 10 P | 3 | 8 | 10.63 | same | same |
| 19 | 2.5 RP | 3 | 1 | 8.00 | same | same |

Figure 1:
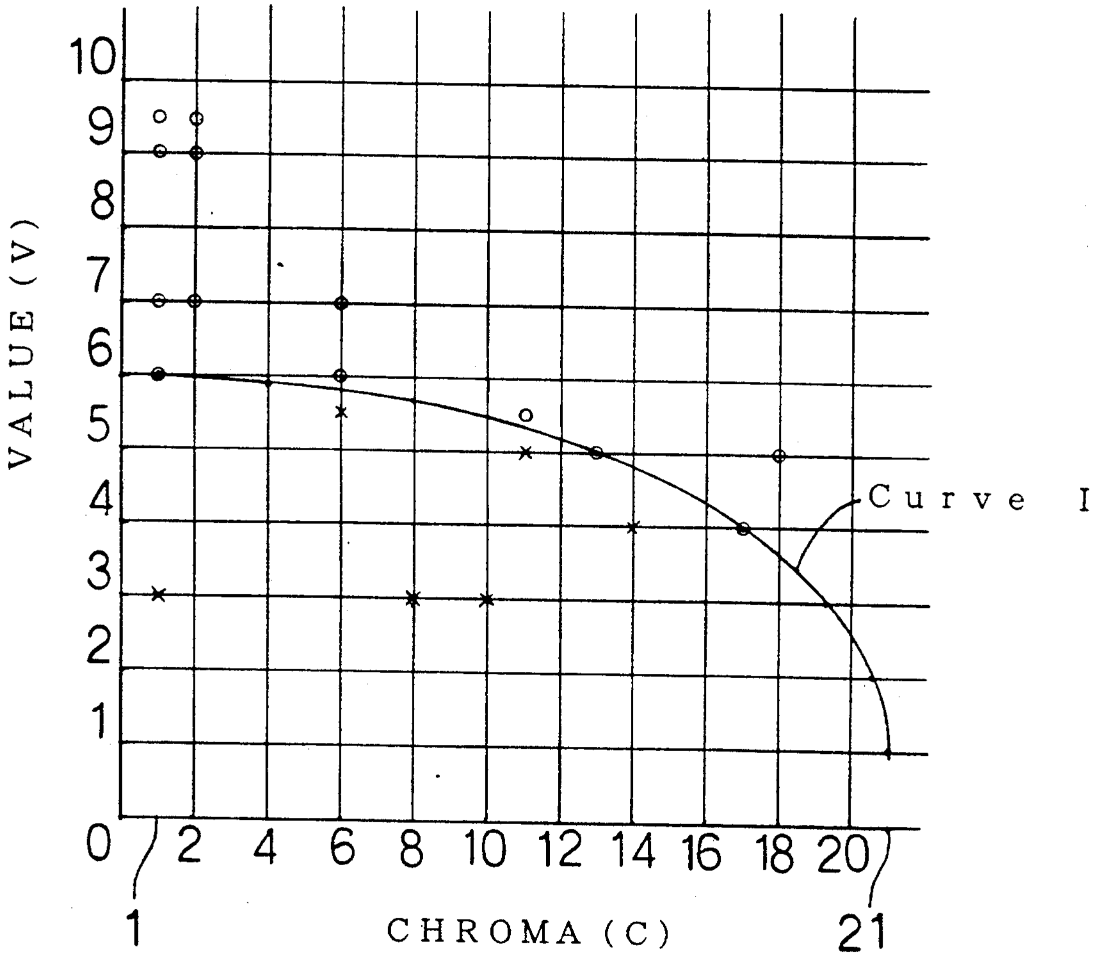
FIG. 1 is a graph showing distribution of data of tests in coordinates of the value and the chrome based on the Munsell system.
Figure 2:
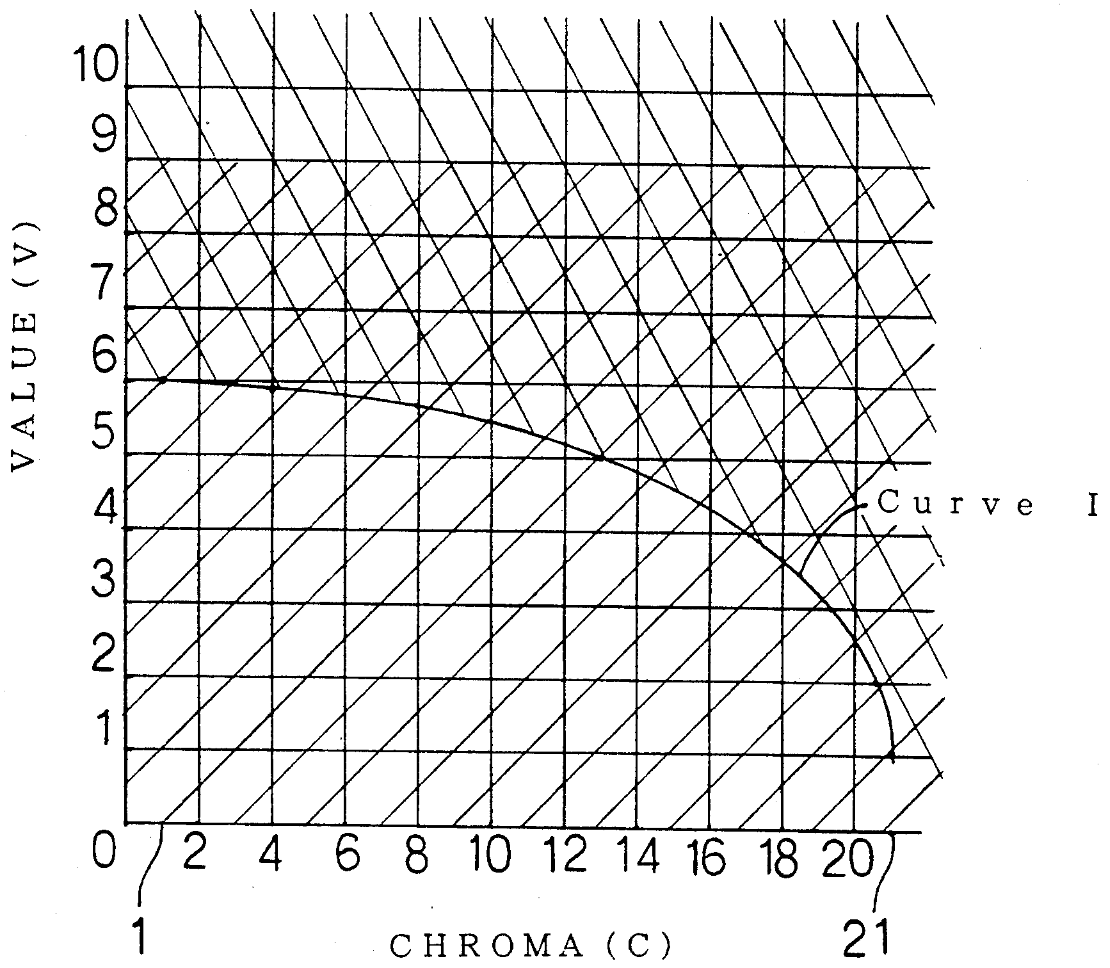
FIG. 2 is a graph showing an area where recorded information is legible and another area where reproductions of the information are illegible.

To simplify the result of the tests, data are shown in FIGS. 1 and 2.

FIG. 1 shows distribution of data of the tests in coordinates system of the value and the chroma. In FIG. 1, data indicated with a circle show legible samples, while data indicated with a cross show illegible samples. Curve 1 indicates the following formula:

$$[(\Delta C)^2+(4\times\Delta V)^2]^{\frac{1}{2}}=20$$

In FIG. 2, an area of oblique lines inclined to the left indicates an area in which recorded information is legible, while an area of oblique lines inclined to the right indicates an area in which reproductions of the information are illegible. Accordingly, an overlapped area of the two areas indicates an area in which the recorded information is, easily read, and in which the reproductions are illegible.

EFFECT OF THE INVENTION

Since the anti-copying composite film according to the present invention is constituted as mentioned above, the following effects are obtainable.

First, it is possible to select unrestrictedly the hue of the color of a colored transparent synthetic resin coating layer.

Secondly, information which has been recorded on the surface of the coating layer is legible.

Thirdly, even if recorded information is reproduced by means of color electrostatic copier, reproductions of the information are illegible, and accordingly, it is possible to prevent the information from being reproduced.

I claim:

1. An anti-copying composite film comprising a substratum of paper or synthetic resin film, a metallic foil formed on the surface of said substratum and a colored transparent synthetic resin coating layer applied to the surface of said metallic foil, the colored transparent synthetic resin coating layer having a color selected from the Munsell color system so that a value of the color is 9 or less than 9 regardless of hue, while a chroma of the color is selected so that an index calculated in accordance with the following formula based on the difference of the chroma and the difference of the value with respect to those of black, is 20 or more than 20:

$$[(\Delta C)^2+(4\times\Delta V^2)]^{\frac{1}{2}}$$

wherein $\Delta C$ is the difference of chroma from that of black, and $\Delta V$ is the difference of value from that of black.

* * * * *